US008823299B2

(12) United States Patent
Yang et al.

(10) Patent No.: US 8,823,299 B2
(45) Date of Patent: Sep. 2, 2014

(54) POWER SUPPLY MODULE FOR HALL SENSORLESS BRUSHLESS DIRECT CURRENT MOTOR

(75) Inventors: Yil Suk Yang, Daejeon (KR); Jongdae Kim, Daejeon (KR); Sewan Heo, Daejeon (KR); Sang Gi Kim, Daejeon (KR); Jimin Oh, Daejeon (KR); Minki Kim, Gyeongsangbuk-do (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 408 days.

(21) Appl. No.: 13/286,455

(22) Filed: Nov. 1, 2011

(65) Prior Publication Data
US 2012/0139463 A1 Jun. 7, 2012

(30) Foreign Application Priority Data

Dec. 7, 2010 (KR) .................. 10-2010-0124221

(51) Int. Cl.
*H02P 6/00* (2006.01)
(52) U.S. Cl.
USPC .................. 318/400.01; 318/599; 318/811
(58) Field of Classification Search
USPC .......... 318/599, 811, 400.01, 400.32, 400.34, 318/400.35, 459, 500
See application file for complete search history.

(56) References Cited

U.S. PATENT DOCUMENTS

| 6,344,464 | B1* | 2/2002 | Bourrie et al. ............... 514/315 |
| 7,088,066 | B2* | 8/2006 | Haller ........................... 318/432 |
| 7,224,133 | B2 | 5/2007 | Nakatsugawa et al. |
| 7,609,013 | B2* | 10/2009 | Sugie ...................... 318/400.06 |
| 7,675,256 | B2 | 3/2010 | Peng et al. |
| 7,692,241 | B2* | 4/2010 | Shibata ........................ 257/341 |
| 2009/0121665 | A1* | 5/2009 | Kuwamura ............. 318/400.13 |
| 2010/0001670 | A1 | 1/2010 | Scalese |

FOREIGN PATENT DOCUMENTS

JP 8214580 A 8/1996
KR 2005-0060433 A 6/2005

OTHER PUBLICATIONS

Yoshitaka Iwaji et al., "Sensorless Motor Control Method for Compressor Applications", 2005 International Appliance Technical Conference, pp. 1-16, 2005.

* cited by examiner

Primary Examiner — Rina Duda
(74) Attorney, Agent, or Firm — Rabin & Berdo, P.C.

(57) ABSTRACT

Disclosed is a power supply module for a hall sensorless BLDC motor, including: a high-voltage/large-current power device t applied with high voltage/large current and including a plurality of power devices driving the hall sensorless brushless direct current (BLDC) motor; a motor driving circuit sensing and controlling a positional signal or a velocity signal of the hall sensorless BLDC motor and generating a PWM control signal for controlling the hall sensorless BLDC motor; and a power device driving circuit driving the high-voltage/large-current power device according to the PWM control signal of the motor driving circuit, wherein the high-voltage/large-current power device, the power device driving circuit, and the motor driving circuit are CMOS-integrated on the same substrate.

8 Claims, 4 Drawing Sheets

< PRIOR ART >

< PRIOR ART >

POWER SUPPLY MODULE FOR HALL SENSORLESS BRUSHLESS DIRECT CURRENT MOTOR

CROSS-REFERENCE TO RELATED APPLICATIONS

This application is based on and claims priority from Korean Patent Application No. 10-2010-0124221, filed on Dec. 7, 2010, with the Korean Intellectual Property Office, the present disclosure of which is incorporated herein in its entirety by reference.

TECHNICAL FIELD

The present disclosure relates to a power supply module, and more particularly, to a power supply module for a hall sensorless brushless direct current motor in which a high-voltage/large-current power device, a power device driving circuit, and a motor driving circuit are CMOS-integrated.

BACKGROUND

A motor is an energy converting device converting electric energy into mechanical energy and environmental friendly power saving components/systems need to be developed with the recent advent of a green ocean environment. Therefore, the demand for a brushless direct current (hereinafter, referred to as 'BLDC') motor having characteristics of low noise, long life span, high efficiency, and high durability has increased, which has a better energy saving function and can be applied to more various application fields than the existing brush type DC motor.

Since the BLDC motor uses an incorporated power semiconductor device instead of a brush or a commutator of the existing DC motor, the BLDC motor requires a power supply module for the BLDC motor including a high-voltage/large-current power device, a power device driving circuit, and a motor driving circuit. The power supply module for the BLDC motor is constituted by a high-voltage/large-current power device chip, a power device driving circuit chip, and a motor driving circuit chip and a 3-chip power supply module for the BLDC motor or a 2-chip power supply module for the BLDC motor has been currently mass-produced according to the application field.

FIG. 1 is a block configuration diagram showing an internal configuration of a 3-chip power supply module for a BLDC motor in the related art.

Referring to FIG. 1, the 3-chip power supply module for the BLDC motor includes a high-voltage/large-current power device chip 110, a power device driving circuit chip 120, and a motor driving circuit chip 130. The respective chips are configured on one board as a module.

FIG. 2A and FIG. 2B is a block configuration diagram showing an internal configuration of a 2-chip power supply module for a BLDC motor in the related art.

As shown in FIG. 2A, the 2-chip power supply module for the BLDC motor is constituted by a high-voltage/large-current power device incorporated power device driving circuit chip 210 and a motor driving circuit chip 220 or as shown in FIG. 2B, the 2-chip power supply module for the BLDC motor is constituted by a high-voltage/large-current power device chip 230 and a power device/motor driving circuit chip 240. The respective chips may be configured on one board as a module. That is, the high-voltage/large-current power device and the power device driving circuit may be implemented as one chip or the power device driving circuit and the motor driving circuit may be implemented as one chip.

However, the 3-chip power supply module for the BLDC motor or the 2-chip power supply module for the BLDC motor in the related art have difficulty in meeting requirements of intelligence, multi-functions, high function, and high integration of components/systems in the future.

SUMMARY

The present disclosure has been made in an effort to provide a high-efficiency power supply module for a hall sensorless BLDC motor in which high integration, low power, high efficiency, high productivity, and high reliability can be achieved and a high-voltage/large-current power device, a power device driving circuit, and a motor driving circuit are CMOS-integrated.

An exemplary embodiment of the present disclosure provides a power supply module for a hall sensorless BLDC motor, including: a high-voltage/large-current power device applied with high voltage/large current and including a plurality of power devices driving the hall sensorless brushless direct current (BLDC) motor; a motor driving circuit sensing and controlling a positional signal or a velocity signal of the hall sensorless BLDC motor and generating a PWM control signal for controlling the hall sensorless BLDC motor; and a power device driving circuit driving the high-voltage/large-current power device according to the PWM control signal of the motor driving circuit, and the high-voltage/large-current power device, the power device driving circuit, and the motor driving circuit are CMOS-integrated on the same substrate.

According to exemplary embodiments of the present disclosure, by a high-efficiency power supply module for a hall sensorless BLDC motor in which a high-voltage/large-current power device, a power device driving circuit, and a motor driving circuit are CMOS-integrated on the same substrate, intelligent, multi-functions, high function, and high integration of the power supply module for the hall sensorless BLDC motor can be achieved and the power supply module can be applied to various application fields.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

In general, the velocity and position of a brushless direct current (hereinafter, referred to as 'BLDC') motor are controlled using a hall sensor or hall sensorless. That is, a hall sensor BLDC motor senses the velocity and position of the BLDC motor by using the hall sensor, while a hall sensorless BLDC motor senses the velocity and position of the motor by using a back electro motive force (BEMF) algorithm.

Meanwhile, the hall sensorless BLDC motor is lower in manufacturing cost and higher in reliability than the hall sensor BLDC motor because the hall sensorless BLDC motor does not have a connection line of the motor and the hall sensor. Therefore, in the exemplary embodiment of the present disclosure, there is provided a power supply module for the hall sensorless BLDC motor.

Figure 1:
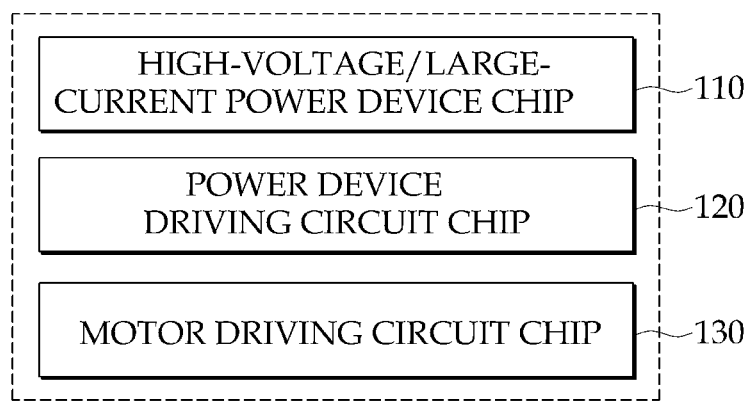
FIG. 1 is a block configuration diagram showing an internal configuration of a 3-chip power supply module for a BLDC motor in the related art.
Figure 2A:
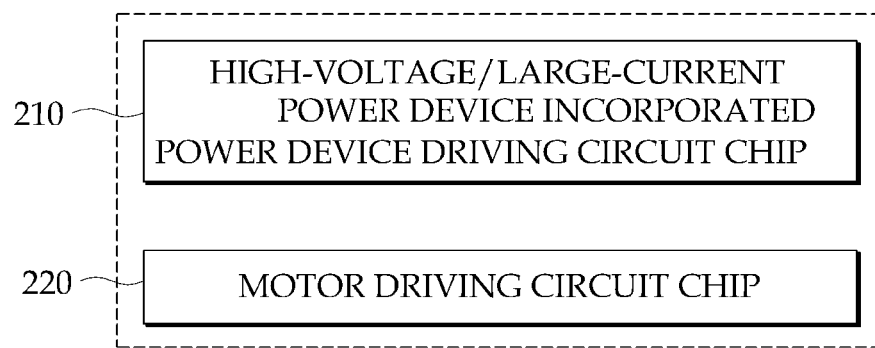
FIG. 2A and FIG. 2B is a block configuration diagram showing an internal configuration of a 2-chip power supply module for a BLDC motor in the related art.
Figure 2B:
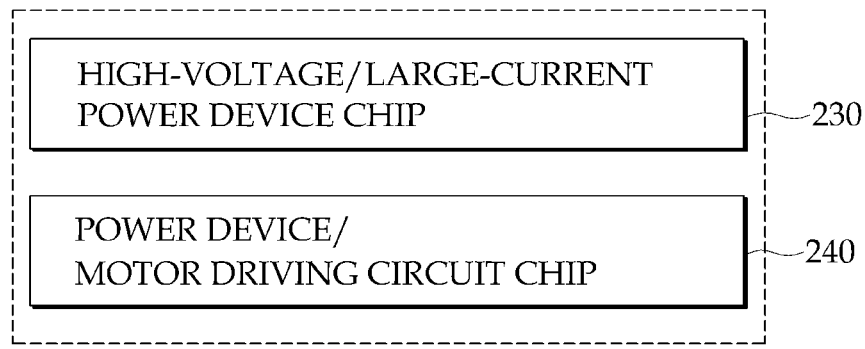
Figure 3:
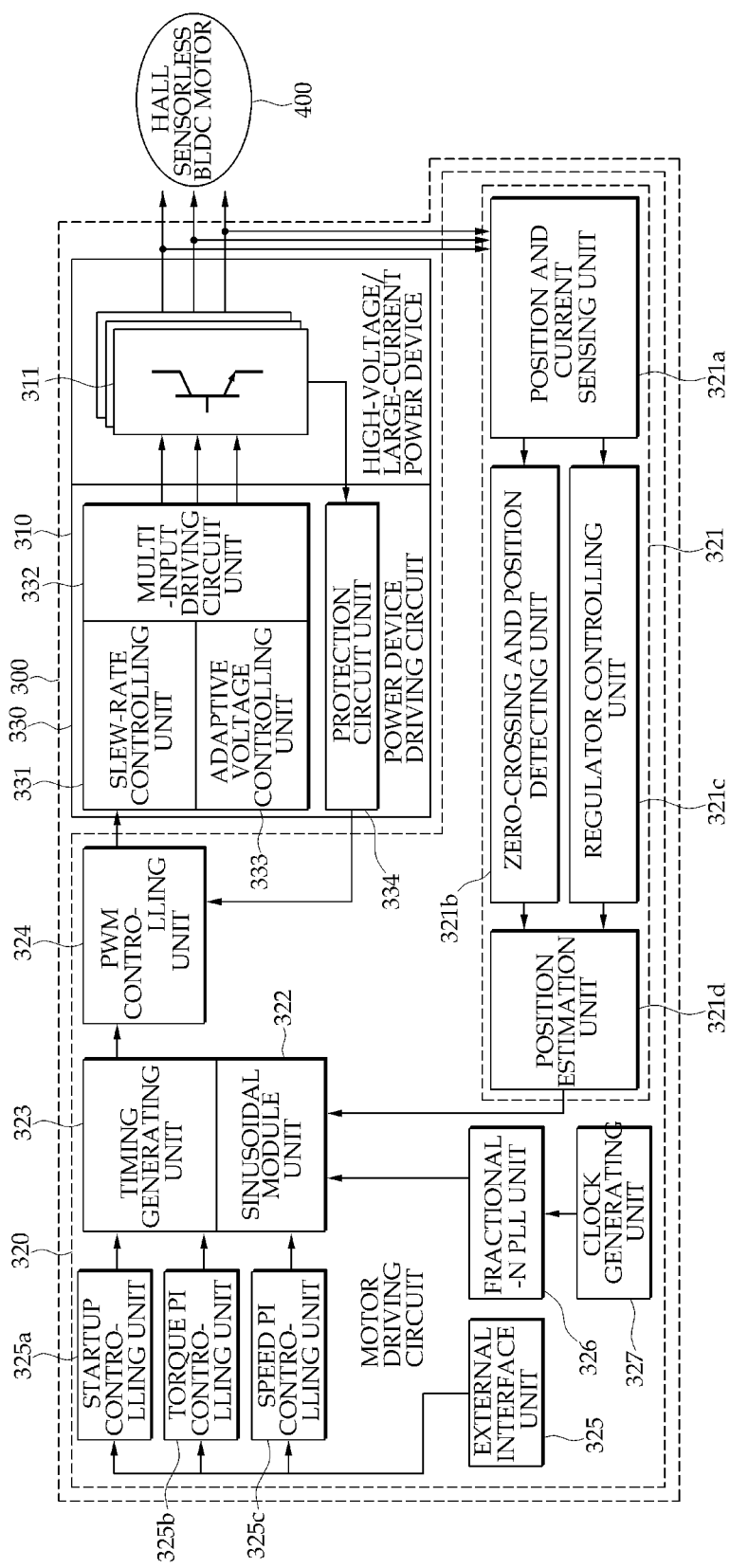
FIG. 3 is a block configuration diagram showing an internal configuration of a power supply module for a hall sensorless BLDC motor according to an exemplary embodiment of the present disclosure.

FIG. 3 is a block configuration diagram showing an internal configuration of a power supply module for a hall sensorless BLDC motor according to an exemplary embodiment of the present disclosure.

Referring to FIG. 3, a power supply module 300 for a hall sensorless BLDC motor according to the exemplary embodiment of the present disclosure includes a high-voltage/large-current power device 310 applied with high voltage/large current and driving a hall sensorless BLDC motor 400, a motor driving circuit 320 sensing and controlling a positional signal or a velocity signal of hall sensorless BLDC motor 400 and generating a PWM control signal for controlling hall sensorless BLDC motor 400, and a power device driving circuit 330 driving high-voltage/large current power device 310 according to the PWM control signal of motor driving circuit 320. Herein, high-voltage/large-current power device 310, power device driving circuit 330, and motor driving circuit 320 are CMOS-integrated on the same substrate.

Since high-voltage/large current power device 310 applies a voltage and a current directly to hall sensorless BLDC motor 400 by the control of power device driving circuit 330, high-voltage/large current power device 310 is constituted by a super junction vertical or super junction trench power device in which a low on-resistance, a high breakdown voltage, and a large driving current can be achieved.

In an incorporated power device rather than a discrete power device, an on-resistance is one of very important design factors due to heat emission and since the on-resistance and the breakdown voltage have a trade-off relationship, the power device needs to be appropriately designed according to an application field. Therefore, high-voltage/large current power device 310 according to the exemplary embodiment of the present disclosure is preferably constituted by a plurality of small-sized power devices rather than one large-sized power device.

Motor driving circuit 320 provides the PWM control signal for controlling hall sensorless BLDC motor 400 by sensing and controlling the positional signal or velocity signal of hall sensorless BLDC motor 400 as an input signal of power device driving circuit 330.

Motor driving circuit 320 according to the exemplary embodiment of the present disclosure includes a positional signal detecting and controlling unit 321, a sinusoidal wave module unit 322, a timing generating unit 323, a PWM controlling unit 324, and an external interface unit 325.

Positional signal detecting and controlling unit 321 detects and controls the positional signal of hall sensorless BLDC motor 400. To this end, positional signal detecting and controlling unit 321 may include a position and current sensing unit 321a sensing the position and current of hall sensorless BLDC motor 400 by using a back electro motive force (BEMF) algorithm, a zero-crossing and position detecting unit 321b sensing the polarity conversion point (zero-crossing) and position of the sensed current, a regulator controlling unit 321c sampling and filtering a voltage level of high voltage/large current applied to hall sensorless BLDC motor 400 at the time when the polarity conversion point is generated and judging whether the polarity conversion point is generated by using the filtered value, and a position estimation unit 321d estimating the positional signal of hall sensorless BLDC motor 400 by using zero-crossing and position detecting unit 321b and regulator controlling unit 321c.

Sinusoidal module unit 322 generates a 180°-sine wave signal by using the positional signal of hall sensorless BLDC motor 400 and a floating point PLL reference signal of a floating point (fractional-N) PLL unit 326. Herein, floating point PLL unit 326 generates the floating point PLL reference signal by 1/N-fractioning a clock signal generated from a clock generating unit 327.

Timing generating unit 323 generates a timing signal for setting an on/off timing of a plurality of power devices 311 included in high-voltage/large-current power device 310.

PWM controlling unit 324 generates the PWM control signal for controlling hall sensorless BLDC motor 400 according to the sine wave signal of sinusoidal module unit 322 and the timing signal of timing generating unit 323.

External interface unit 325 is connected with the outside in series or in parallel to receive an external control signal for controlling driving, rotation, and velocity of hall sensorless BLDC motor 400 from the outside. Herein, the external control signals for controlling the driving, rotation, and velocity of hall sensorless BLDC motor 400 are applied to a startup controlling unit 325a, a torque PI controlling unit 325b, and a speed PI controlling unit 325c, respectively.

Power device driving circuit 330 drives high-voltage/large-current power device 310, that is, a plurality of power devices 311 included in high-voltage/large-current power device 310, according to the PWM control signal of motor driving circuit 320.

Power device driving circuit 330 turns on/off a plurality of power devices 311 to the max when an output load of the power device is large, that is, a driving current is large and turns on/off a plurality of power devices 311 to the min when the driving current is small, to control the driving current according to the output load of the power device, thereby minimizing power consumption of power device driving circuit 330.

Power device driving circuit 330 includes a slew rate controlling unit 331 reducing a short-circuit current of high-voltage/large-current power device 310 by preventing a plurality of power devices 311 from being simultaneously turned on/off, a multi-input driving circuit unit 332 turning on/off a plurality of power devices 311, and an adaptive voltage controlling unit 333 controlling multi-input driving circuit unit 332 according to the output load of high-voltage/large-current power device 310. Herein, power device driving circuit 330 may further include a protection circuit unit 334 protecting high-voltage/large-current power device 310 from overvoltage, overcurrent, and overtemperature.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A power supply module for a hall sensorless BLDC motor, comprising:
   a high-voltage/large-current power device applied with high voltage/large current and including a plurality of power devices driving the hall sensorless brushless direct current (BLDC) motor;
   a motor driving circuit sensing and controlling a positional signal or a velocity signal of the hall sensorless BLDC motor and generating a PWM control signal for controlling the hall sensorless BLDC motor; and
   a power device driving circuit driving the high-voltage/large-current power device according to the PWM control signal of the motor driving circuit,
   wherein the high-voltage/large-current power device, the power device driving circuit, and the motor driving circuit are CMOS-integrated on the same substrate, and
   wherein the power device driving circuit includes:
      a slew-rate controlling unit preventing the plurality of power devices from being simultaneously turned on/off;
      a multi-input driving circuit unit turning on/off the plurality of power devices; and
      an adaptive voltage controlling unit controlling the multi-input driving circuit unit according to the output load of the high-voltage/large-current power device.

2. The power supply module for a hall sensorless BLDC motor of claim 1, wherein each power device is constituted by a super junction vertical or super junction trench power device.

3. The power supply module for a hall sensorless BLDC motor of claim 1, wherein the power device driving circuit controls a driving current of the high-voltage/large-current power device according to an output load of the high-voltage/large-current power device.

4. The power supply module for a hall sensorless BLDC motor of claim 1, wherein the power device driving circuit further includes a protection circuit unit protecting the high-voltage/large-current power device from overvoltage, overcurrent, and overtemperature.

5. A power supply module for a hall sensorless BLDC motor, comprising:
   a high-voltage/large-current power device applied with high voltage/large current and including a plurality of power devices driving the hall sensorless brushless direct current (BLDC) motor;
   a motor driving circuit sensing and controlling a positional signal or a velocity signal of the hall sensorless BLDC motor and generating a PWM control signal for controlling the hall sensorless BLDC motor; and
   a power device driving circuit driving the high-voltage/large-current power device according to the PWM control signal of the motor driving circuit,
   wherein the high-voltage/large-current power device, the power device driving circuit, and the motor driving circuit are CMOS-integrated on the same substrate, and
   wherein the motor driving circuit includes:
      a positional signal detecting and controlling unit detecting and controlling a positional signal of the hall sensorless BLDC motor;
      a sinusoidal module unit generating a 180°-sine wave signal by using the positional signal of the hall sensorless BLDC motor and a floating-point PLL reference signal;
      a timing generating unit generating a timing signal for setting an on/off timing of the plurality of power devices;
      a PWM controlling unit generating the PWM control signal for controlling the hall sensorless BLDC motor according to the sine wave signal and the timing signal; and
      an external interface unit connected with the outside in series or in parallel to receive an external control signal for controlling driving, rotation, and velocity of the hall sensorless BLDC motor from the outside.

6. The power supply module for a hall sensorless BLDC motor of claim 5, wherein the positional signal detecting and controlling unit includes:
   a position and current sensing unit sensing the position and current of the hall sensorless BLDC motor by using a back electro motive force (BEMF) algorithm;
   a zero-crossing and position detectingn unit sensing a polarity conversion point (zero-crossing) and position of the sensed current;
   a regulator controlling unit sampling and filtering a voltage level of high voltage/large current applied to the hall sensorless BLDC motor at the time when the polarity conversion point is generated and judging whether the polarity conversion point is generated by using the filtered value; and
   a position estimation unit estimating the positional signal of the hall sensorless BLDC motor by using the zero-crossing and position detecting unit and the regulator controlling unit.

7. The power supply module for a hall sensorless BLDC motor of claim 5, wherein each power device is constituted by a super junction vertical or super junction trench power device.

8. The power supply module for a hall sensorless BLDC motor of claim 5, wherein the power device driving circuit controls a driving current of the high-voltage/large-current power device according to an output load of the high-voltage/large-current power device.

* * * * *